US012350224B1

(12) United States Patent
Cun et al.

(10) Patent No.: US 12,350,224 B1
(45) Date of Patent: Jul. 8, 2025

(54) MASSAGER WITH TELESCOPIC OPENING AND CLOSING STRUCTURE

(71) Applicants: Shenzhen Envision Technology Innovation Co., Ltd., Guangdong (CN); Dongguan Yishuo Electronic Technology Co., Ltd., Guangdong (CN)

(72) Inventors: Lang Cun, Guangdong (CN); Quan Zhao, Guangdong (CN)

( * ) Notice: Subject to any disclaimer, the term of this patent is extended or adjusted under 35 U.S.C. 154(b) by 0 days.

(21) Appl. No.: 19/016,408

(22) Filed: Jan. 10, 2025

(30) Foreign Application Priority Data

Dec. 31, 2024 (CN) ........................ 202423288309.3

(51) Int. Cl.
*A61H 23/00* (2006.01)
*A61H 23/02* (2006.01)

(52) U.S. Cl.
CPC ... *A61H 23/0254* (2013.01); *A61H 2201/149* (2013.01)

(58) Field of Classification Search
CPC .. A61H 23/0254; A61H 23/004; A61H 23/00; A61H 21/00; A61H 19/00; A61H 19/32; A61H 19/34; A61H 19/40; A61H 19/44; A61H 19/50; A61H 7/004–005
See application file for complete search history.

(56) References Cited

U.S. PATENT DOCUMENTS 12,178,773 B1 * 12/2024 Wang ..................... A61H 19/44
2024/0325237 A1 * 10/2024 Peng ................. A61H 23/0254

FOREIGN PATENT DOCUMENTS

DE 202024106368 U1 * 12/2024

* cited by examiner

*Primary Examiner* — Margaret M Luarca
*Assistant Examiner* — Sarah B Lederer

(57) ABSTRACT

A massager with telescopic opening and closing structure, comprising a shell, wherein a telescopic opening and closing component is provided inside the shell; the telescopic opening and closing component comprises a driving component, a moving part, a first fixing part, a second fixing part, a rod of pendulum, and an opening and closing pendulum part; the opening and closing pendulum part is connected to the first fixing part via the rod of pendulum, and is placed on a periphery side of the second fixing part and is rotatably connected thereto; the driving component is used to drive the moving part to move. The invention increases interest through the arrangement of the telescopic opening and closing component, and the structures are related to each other and the movement is more stable, while the comfort of use is improved.

7 Claims, 5 Drawing Sheets

MASSAGER WITH TELESCOPIC OPENING AND CLOSING STRUCTURE

TECHNICAL FIELD

The invention provides a massager with telescopic opening and closing structure, belonging to the technical field of massagers.

BACKGROUND ART

Adult massagers are adult products designed to provide sexual pleasure and sexual stimulation, usually including vibrators, massage sticks, etc. These products are designed to meet individual sexual needs and preferences through different vibration modes, intensities and shapes.

Based on the above, it is found that:

in most cases, the existing massagers are only provided with a single vibration mode to massage the user during use, which lacks interest and has a relatively complex structure, lacks coordination between each other, has unstable movement, and is poor in comfort.

Therefore, in view of this, the existing structure is studied and improved, and a massager with a telescopic opening and closing structure is proposed to solve the above problems.

SUMMARY OF THE INVENTION

The technical problem to be solved by the invention is that the traditional massager with a telescopic opening and closing structure lacks interest, has unstable movement and poor comfort in use.

In order to solve the above technical problems, the invention provides a massager with telescopic opening and closing structure, comprising a shell, wherein a telescopic opening and closing component is provided inside the shell; the telescopic opening and closing component comprises a driving component, a moving part, a first fixing part, a second fixing part, a rod of pendulum, and an opening and closing pendulum part; the opening and closing pendulum part is connected to the first fixing part via the rod of pendulum, and is placed on a periphery side of the second fixing part and is rotatably connected thereto; the driving component is used to drive the moving part to move.

Further, the driving component comprises a motor, a rotating rod, a moving block, and a moving plate; the motor is arranged inside the shell and fixedly connected thereto, and an output end of the motor is fixedly connected to the rotating rod.

Further, the rotating rod is provided with a rotating groove that is cooperated with the moving block; the rotating rod is arranged inside the moving part, and a right side of the moving part is provided with a groove communicating with the inside.

Further, the moving block and the moving plate are arranged in the groove and cooperate with each other; one end of the moving block extends into an interior of the moving part and is located in the rotating groove; an inner wall of the groove and an inner side of the moving plate are provided with a placing groove adapted to a rod part of the moving block, and the rod part of the moving block is placed in the placing groove.

Further, the periphery side of the second fixing part is provided with a limiting groove; an inserting rod of the moving part passes through the first fixing part and is placed in the limiting groove, and the inserting rod is fixedly connected to an inner wall of the limiting groove.

Further, the rod of pendulum is provided with three, and the three rods of pendulum are arranged equidistantly along the center of the first fixing part; the rod of pendulum is rotatably connected to the first fixing part, and the other end of the rod of pendulum is rotatably connected to the opening and closing pendulum part.

Further, the rod of pendulum is provided with three, and the three rods of pendulum are arranged equidistantly along the center of the first fixing part; the rod of pendulum is rotatably connected to the first fixing part, and the other end of the rod of pendulum is rotatably connected to the opening and closing pendulum part.

Further, the driving motor is arranged in the fixing cavity and is fixedly connected thereto; the first fixing plate and the second fixing plate are respectively arranged in the rotating shell and is fixedly connected thereto; an output end of the driving motor is fixedly connected to the rotating shaft, and the other end of the rotating shaft is fixedly connected to the first fixing plate.

Further, the connecting plate is arranged between the first fixing plate and the second fixing plate and is fixedly connected thereto, and the filling head is arranged in the rotating shell and is fixedly connected to the second fixing plate.

Due to the adoption of the above technical solution, the massager with telescopic opening and closing structure according to the invention has the following beneficial effects:

1. The invention realizes the opening and closing of the opening and closing pendulum part by setting the telescopic opening and closing component, which increases the fun compared with the massager with vibration mode.
2. In the invention, the driving component, the moving part, the first fixing part, the second fixing part, the rod of pendulum, and the opening and closing pendulum part are used in coordination with each other, and the structures are related to each other and the movement is more stable.
3. The invention improves the comfort of use by providing the stirring component and indirectly driving the rotation of the rotating shell by the driving motor.

BRIEF DESCRIPTION OF THE DRAWINGS

The accompanying drawings are used to provide a further understanding of the invention and constitute a part of the specification. They are used to explain the invention together with the embodiments of the invention and do not constitute a limitation of the invention.

In the Figures.

1 refers to the shell; 2 refers to the moving part; 3 refers to the first fixing part; 4 refers to the second fixing part; 5 refers to the rod of pendulum; 6 refers to the opening and closing pendulum part; 7 refers to the motor; 8 refers to the rotating rod; 9 refers to the moving block; 10 refers to the moving plate; 11 refers to the rotating groove; 12 refers to the groove; 13 refers to the placing groove; 14 refers to the rod part; 15 refers to the inserting rod; 16 refers to the limiting groove; 17 refers to the fixing cavity; 18 refers to the rotating shell; 19 refers to the driving motor; 20 refers to the rotating shaft; 21 refers to the first fixing plate; 22 refers to the second fixing plate; 23 refers to the connecting plate; 24 refers to the filling head; 25 refers to the rotating block; 26 refers to the groove body.

SPECIFIC EMBODIMENT OF THE INVENTION

The technical solutions in the embodiments of the invention will be clearly and completely described hereinafter with reference to the drawings in the embodiments of the invention. Obviously, the described embodiments are only a part of the embodiments of the invention, rather than all the embodiments. Based on the embodiments of the invention, all other embodiments obtained by those of ordinary skill in the art without creative efforts shall fall within the protection scope of the invention.

The invention fully explains the problems of the prior art in the technical background, and there are no superordinate or general problems. The problems to be solved by the invention are described in detail in the following content and specific implementation methods, the technical problems to be solved by the technical solution are clarified, and it is determined that the technical solution of the invention has beneficial effects relative to the objective prior art.

Figure 1:
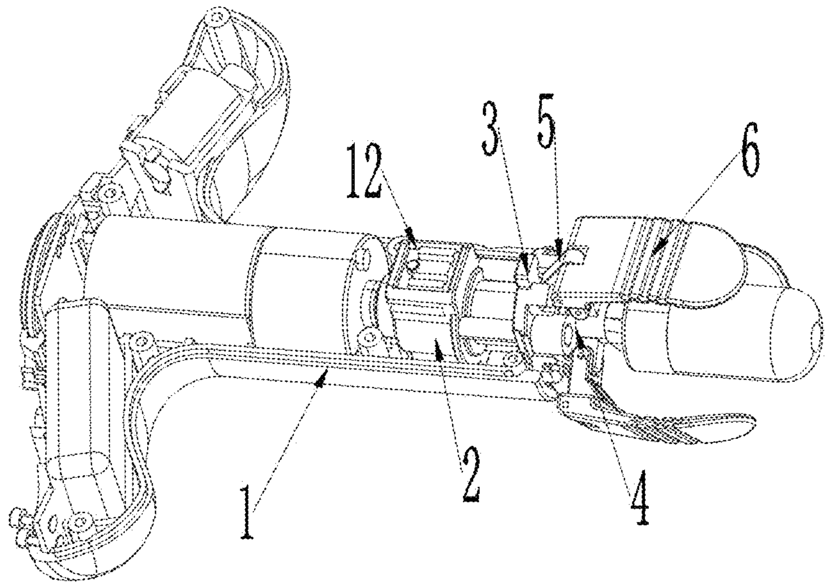
FIG. 1 is a first perspective view of the massager with telescopic opening and closing structure according to the invention.
Figure 2:
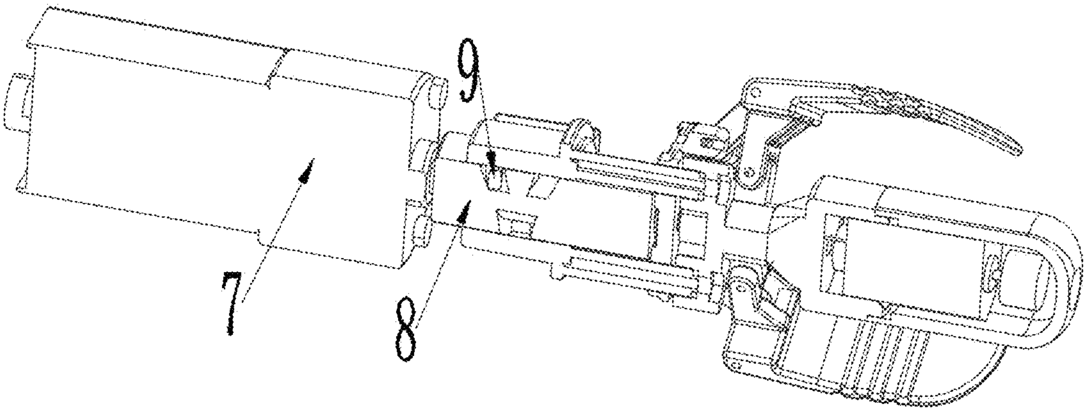
FIG. 2 is a three-dimensional diagram of the interior of the massager with telescopic opening and closing structure according to the invention.
Figure 3:
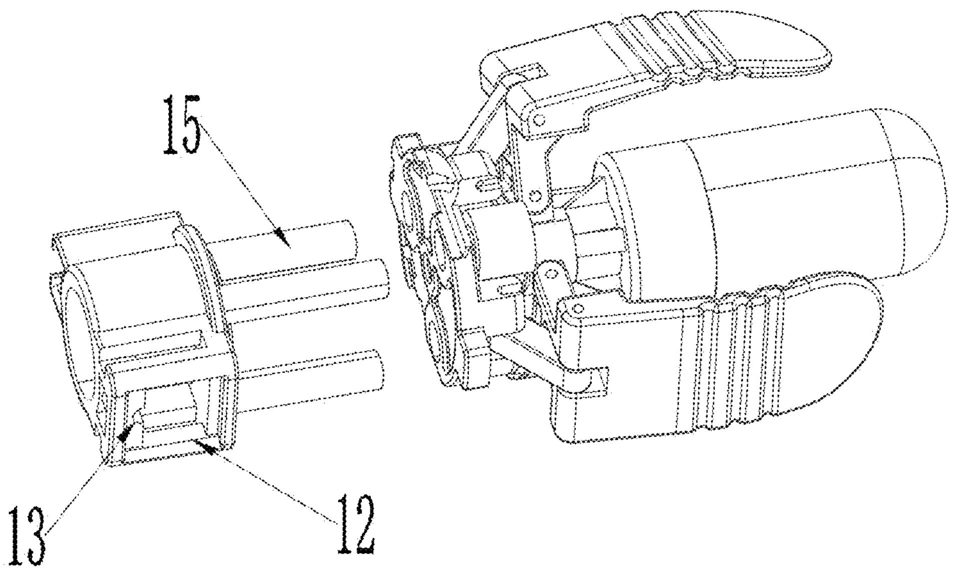
FIG. 3 is a first partial three-dimensional diagram of the massager with telescopic opening and closing structure according to the invention.
Figure 4:
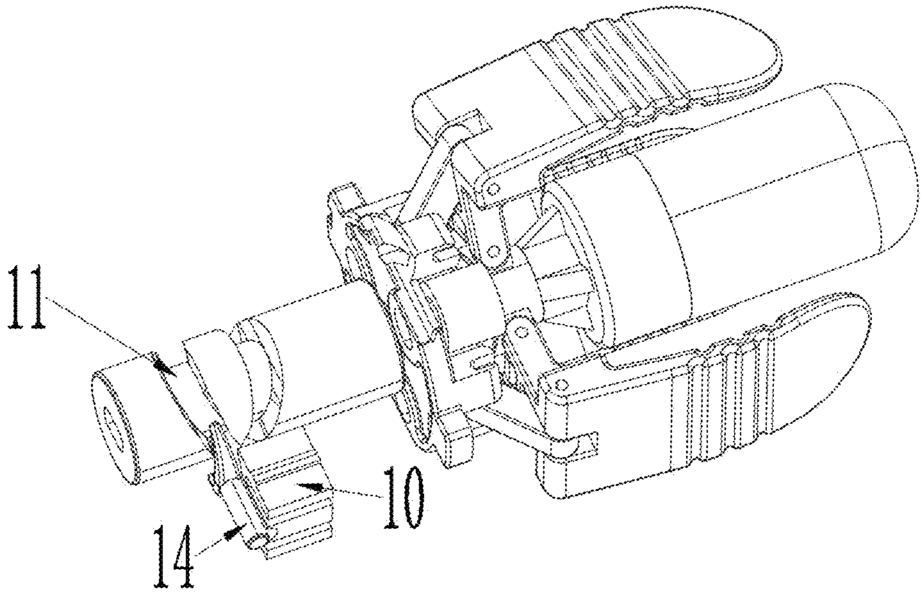
FIG. 4 is a second partial three-dimensional diagram of the massager with telescopic opening and closing structure according to the invention.
Figure 5:
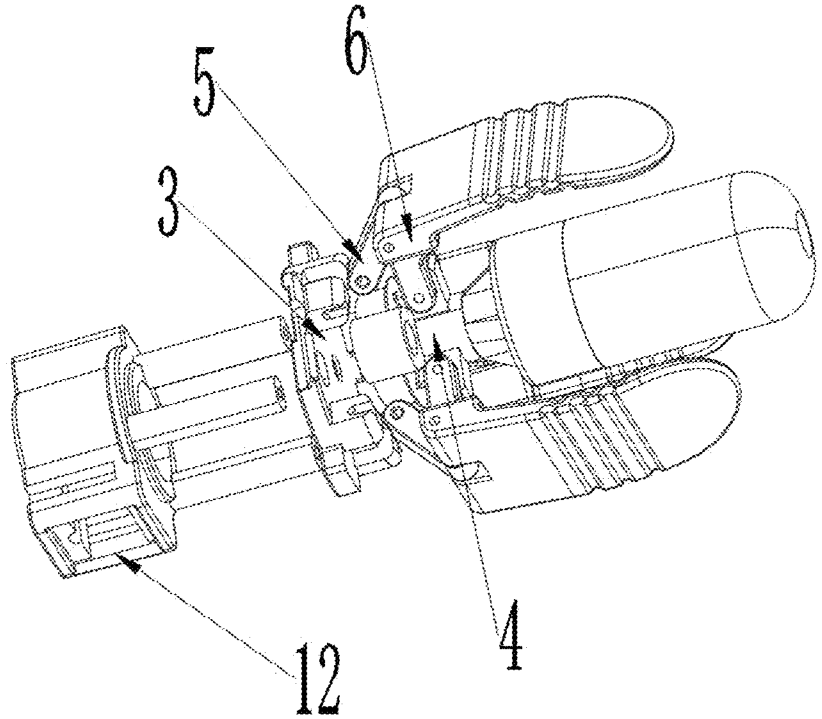
FIG. 5 is a third partial three-dimensional diagram of the massager with telescopic opening and closing structure according to the invention.
Figure 6:
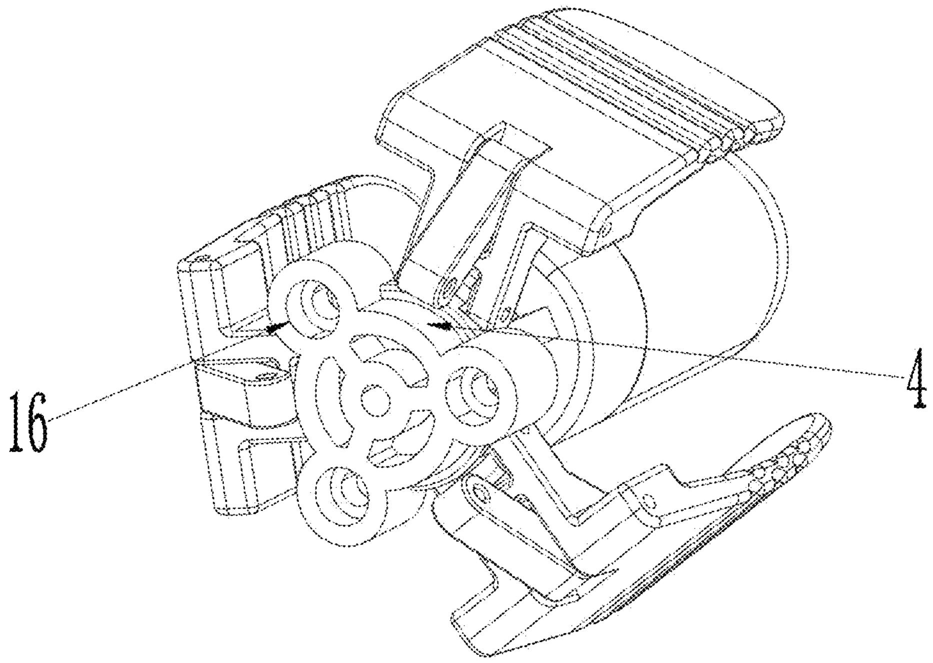
FIG. 6 is a three-dimensional view of the second fixing part in the massager with telescopic opening and closing structure according to the invention.
Figure 7:
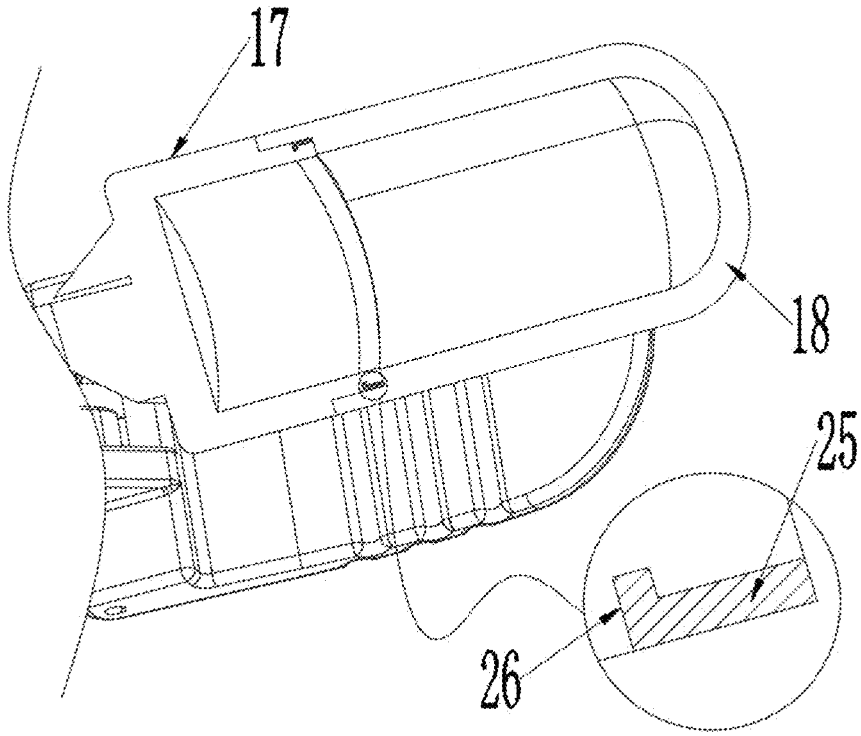
FIG. 7 is a first perspective view of the stirring component in the massager with telescopic opening and closing structure according to the invention.
Figure 8:
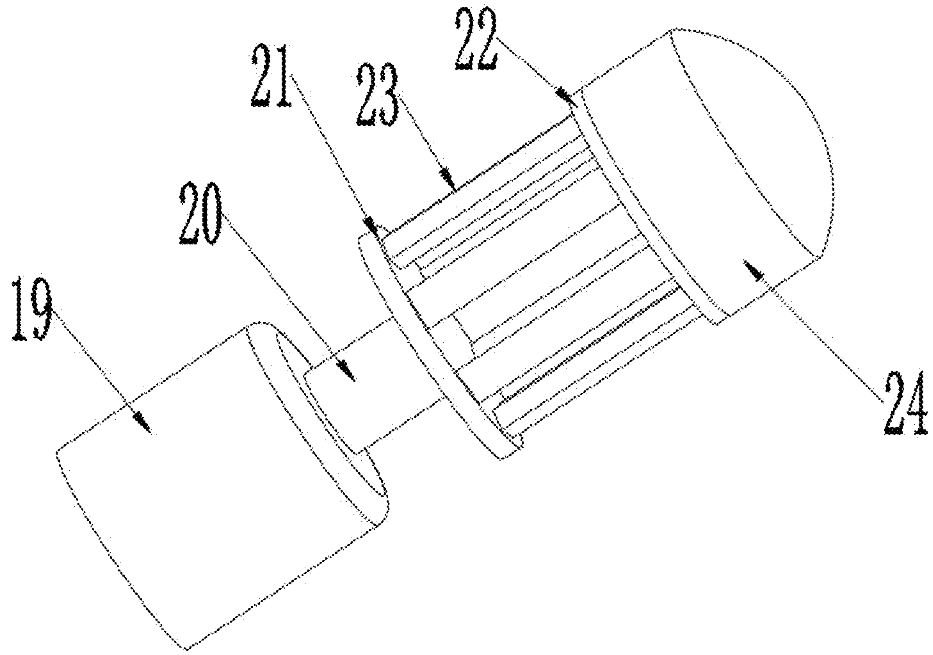
FIG. 8 is a second perspective view of the stirring component in the massager with telescopic opening and closing structure according to the invention.
Figure 9:
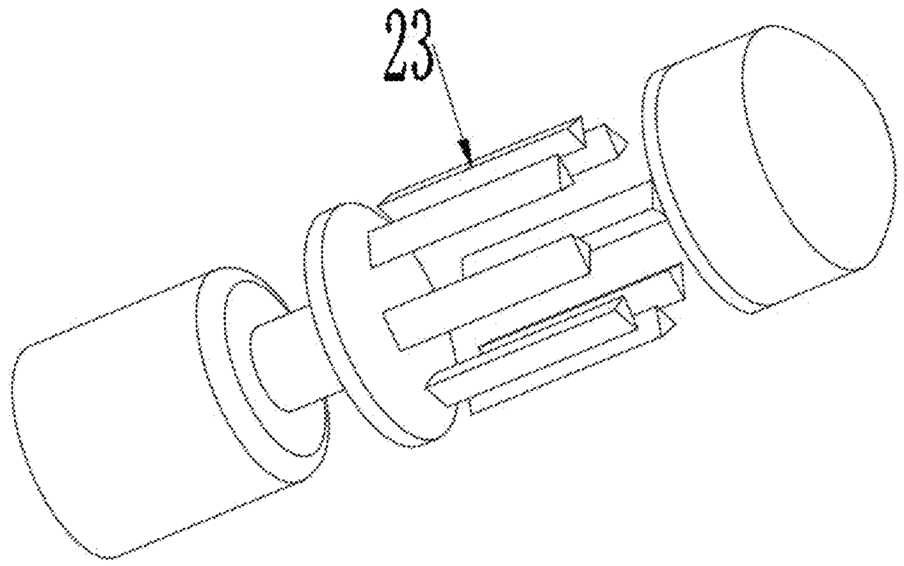
FIG. 9 is a third perspective view of the stirring component in the massager with telescopic opening and closing structure according to the invention.

With reference to FIGS. 1-9, a massager with telescopic opening and closing structure, comprising a shell 1, wherein a telescopic opening and closing component is provided inside the shell; the telescopic opening and closing component comprises a driving component, a moving part 2, a first fixing part 3, a second fixing part 4, a rod of pendulum 5, and an opening and closing pendulum part 6; the opening and closing pendulum part 6 is connected to the first fixing part 3 via the rod of pendulum 5, and is placed on a periphery side of the second fixing part 4 and is rotatably connected thereto; the driving component is used to drive the moving part 2 to move.

The driving component comprises a motor 7, a rotating rod 8, a moving block 9, and a moving plate 10; the motor 7 is arranged inside the shell 1 and fixedly connected thereto, and an output end of the motor 7 is fixedly connected to the rotating rod 8.

The rotating rod 8 is provided with a rotating groove 11 that is cooperated with the moving block 9; the rotating rod 8 is arranged inside the moving part 2, and a right side of the moving part 2 is provided with a groove 12 communicating with the inside.

The moving block 9 and the moving plate 10 are arranged in the groove 12 and cooperate with each other; one end of the moving block 9 extends into an interior of the moving part 2 and is located in the rotating groove 11; an inner wall of the groove 12 and an inner side of the moving plate 10 are provided with a placing groove 13 adapted to a rod part 14 of the moving block 9, and the rod part 14 of the moving block 9 is placed in the placing groove 13.

The periphery side of the second fixing part 4 is provided with a limiting groove 16; an inserting rod 15 of the moving part 2 passes through the first fixing part 3 and is placed in the limiting groove 16, and the inserting rod 15 is fixedly connected to an inner wall of the limiting groove 16.

The rod of pendulum 5 is provided with three, and the three rods of pendulum 5 are arranged equidistantly along the center of the first fixing part 3; the rod of pendulum 5 is rotatably connected to the first fixing part 3, and the other end of the rod of pendulum 5 is rotatably connected to the opening and closing pendulum part 6.

A head of the second fixing part 4 is fixedly connected with a stirring component, which comprises a fixing cavity 17, a rotating shell 18, a driving motor 19, a rotating shaft 20, a first fixing plate 21, a second fixing plate 22, a connecting plate 23, and a filling head 24; the fixing cavity 17 is fixedly connected to the second fixing part 4; an inner side of the rotating shell 18 is fixedly connected with a rotating block 25, and the fixing cavity 17 is provided with a groove body 26 adapted to the rotating block 25; the rotating block 25 is arranged in the groove body 26, and a vertical section of the rotating block 25 is L-shaped.

The driving motor 19 is arranged in the fixing cavity 17 and is fixedly connected thereto; the first fixing plate 21 and the second fixing plate 22 are respectively arranged in the rotating shell 18 and is fixedly connected thereto; an output end of the driving motor 19 is fixedly connected to the rotating shaft 20, and the other end of the rotating shaft 20 is fixedly connected to the first fixing plate 21.

The connecting plate 23 is arranged between the first fixing plate 21 and the second fixing plate 22 and is fixedly connected thereto, and the filling head 24 is arranged in the rotating shell 18 and is fixedly connected to the second fixing plate 22.

The principle of the massager with telescopic opening and closing structure according to the invention is:

is arranged in the placing groove. The motor drives the rotating rod to rotate in the moving part. At this time, the moving block is at a different position of the rotating groove, so that the moving block moves up and down in the rotating groove. The moving block pushes the moving plate and the moving part to move during the movement. Since the inserting rod of the moving part is fixedly connected to the second fixing part, the moving part drives the second fixing part and the first fixing part to move up and down on the inserting rod, and the opening and closing pendulum part and the second fixing part are rotationally connected, and the two ends of the rod of pendulum are rotationally connected to the first fixing part and the opening and closing pendulum part respectively. Therefore, when the second fixing part is downward, the opening and closing pendulum part is driven to open and close under the action of the rod of pendulum.

The driving motor drives the rotating shaft, the first fixing plate, the connecting plate, the second fixing plate, and the filling head to rotate. Since the first fixing plate and the second fixing plate are fixedly connected to the rotating shell, the rotating shell is driven to rotate, and the rotating block rotates in the groove body at the same time.

The invention increases interest through the arrangement of the telescopic opening and closing component, and the structures are related to each other and the movement is more stable, while the comfort of use is improved.

The invention and the embodiments thereof are described hereinabove, and this description is not restrictive. What is shown in the drawings is only one of the embodiments of the invention, and the actual structure is not limited thereto. All in all, structural methods and embodiments similar to the technical solution without deviating from the purpose of the invention made by those of ordinary skill in the art without creative design shall all fall within the protection scope of the invention.

The invention claimed is:

1. A massager with telescopic opening and closing structure, comprising a shell and a telescopic opening and closing component;

the telescopic opening and closing component comprises a driving component, a moving part, a first fixing part, a second fixing part, a rod of pendulum, and an opening and closing pendulum part; the opening and closing pendulum part is connected to the first fixing part via the rod of pendulum, and is placed on a periphery side of the second fixing part and is rotatably connected thereto;

the driving component comprises a motor, a rotating rod, a moving block, and a moving plate; the motor is arranged inside the shell and fixedly connected thereto, and an output end of the motor is fixedly connected to the rotating rod; the rotating rod is provided with a rotating groove that is cooperated with the moving block; the rotating rod is arranged inside the moving part, and a right side of the moving part is provided with a groove communicating with the inside, the driving component is used to drive the moving part to move.

2. The massager with telescopic opening and closing structure of claim 1, wherein the moving block and the moving plate are arranged in the groove and cooperate with each other; one end of the moving block extends into an interior of the moving part and is located in the rotating groove; an inner wall of the groove and an inner side of the moving plate are provided with a placing groove adapted to a rod part of the moving block, and the rod part of the moving block is placed in the placing groove.

3. The massager with telescopic opening and closing structure of claim 1, wherein the periphery side of the second fixing part is provided with a limiting groove; an inserting rod of the moving part passes through the first fixing part and is placed in the limiting groove, and the inserting rod is fixedly connected to an inner wall of the limiting groove.

4. The massager with telescopic opening and closing structure of claim 1, wherein the rod of pendulum is provided with three, and the three rods of pendulum are arranged equidistantly along the center of the first fixing part; the rod of pendulum is rotatably connected to the first fixing part, and the other end of the rod of pendulum is rotatably connected to the opening and closing pendulum part.

5. The massager with telescopic opening and closing structure of claim 1, wherein a head of the second fixing part is fixedly connected with a stirring component, which comprises a fixing cavity, a rotating shell, a driving motor, a rotating shaft, a first fixing plate, a second fixing plate, a connecting plate, and a filling head; the fixing cavity is fixedly connected to the second fixing part; an inner side of the rotating shell is fixedly connected with a rotating block, and the fixing cavity is provided with a groove body adapted to the rotating block; the rotating block is arranged in the groove body, and a vertical section of the rotating block is L-shaped.

6. The massager with telescopic opening and closing structure of claim 5, wherein the driving motor is arranged in the fixing cavity and is fixedly connected thereto; the first fixing plate and the second fixing plate are respectively arranged in the rotating shell and is fixedly connected thereto; an output end of the driving motor is fixedly connected to the rotating shaft, and the other end of the rotating shaft is fixedly connected to the first fixing plate.

7. The massager with telescopic opening and closing structure of claim 5, wherein the connecting plate is arranged between the first fixing plate and the second fixing plate and is fixedly connected thereto, and the filling head is arranged in the rotating shell and is fixedly connected to the second fixing plate.

* * * * *